United States Patent
Takahashi et al.

(10) Patent No.: US 10,236,497 B2
(45) Date of Patent: Mar. 19, 2019

(54) INTERMITTENTLY COATED BATTERY ELECTRODE MANUFACTURING METHOD

(71) Applicant: NEC Energy Devices, Ltd., Sagamihara-shi, Kanagawa (JP)

(72) Inventors: Masahiro Takahashi, Sagamihara (JP); Tetsuya Sato, Sagamihara (JP)

(73) Assignee: NEC ENERGY DEVICES, LTD., Sagamihara-shi, Kanagawa (JP)

(*) Notice: Subject to any disclaimer, the term of this patent is extended or adjusted under 35 U.S.C. 154(b) by 85 days.

(21) Appl. No.: 14/904,729

(22) PCT Filed: Jun. 17, 2014

(86) PCT No.: PCT/JP2014/065956
§ 371 (c)(1),
(2) Date: Jan. 13, 2016

(87) PCT Pub. No.: WO2015/019711
PCT Pub. Date: Feb. 12, 2015

(65) Prior Publication Data
US 2016/0164069 A1    Jun. 9, 2016

(30) Foreign Application Priority Data

Aug. 6, 2013   (JP) .................................. 2013-163285

(51) Int. Cl.
*H01M 4/04*    (2006.01)
*H01M 4/74*    (2006.01)
(Continued)

(52) U.S. Cl.
CPC ......... *H01M 4/0404* (2013.01); *H01M 10/48* (2013.01); *B05D 1/26* (2013.01);
(Continued)

(58) Field of Classification Search
CPC ........ B05D 1/26; B05D 2252/02; B05D 5/00; H01M 10/48; H01M 4/0404; H01M 4/747
See application file for complete search history.

(56) References Cited

U.S. PATENT DOCUMENTS

| 5,766,356 A | 6/1998 | Kurimoto |
| 6,051,338 A * | 4/2000 | Miyazaki ................ H01M 4/04 429/211 |

(Continued)

FOREIGN PATENT DOCUMENTS

| JP | 09-019654 A | 1/1997 |
| JP | 11-010061 A | 1/1999 |

(Continued)

OTHER PUBLICATIONS

International Search Report for PCT/JP2014/065956 dated Jul. 15, 2014 [PCT/ISA/210].

*Primary Examiner* — Carlos Barcena
(74) *Attorney, Agent, or Firm* — Sughrue Mion, PLLC

(57) ABSTRACT

An intermittently coated battery electrode manufacturing method capable of preventing a positional displacement from occurring between a first surface of a collector and a second surface opposed to the first surface. The intermittently coated battery electrode manufacturing method includes: forming, at a part of a strip-shaped collector where an active material is not coated, a front end indicator indicating a front end of the active material to be intermittently coated on the collector; performing coating of the active material on a first surface of the collector based on a detection signal of the front end indicator to form an intermittent coating layer; and starting coating of the intermittent coating layer on a second surface opposite to the first surface based on the detection signal of the same front end (Continued)

indicator as that used for forming the active material coating layer on the first surface.

6 Claims, 5 Drawing Sheets

(51) Int. Cl.
    *H01M 10/48*     (2006.01)
    *B05D 5/00*     (2006.01)
    *B05D 1/26*     (2006.01)

(52) U.S. Cl.
    CPC ............ *B05D 5/00* (2013.01); *B05D 2252/02* (2013.01); *H01M 4/747* (2013.01)

(56) References Cited

U.S. PATENT DOCUMENTS

| | | |
|---|---|---|
| 6,423,446 B1 | 7/2002 | Miyazaki et al. |
| 2005/0008778 A1* | 1/2005 | Utsugi .................. C23C 14/042 |
| | | 427/248.1 |
| 2006/0040181 A1* | 2/2006 | Kim ........................ H01M 2/30 |
| | | 429/211 |
| 2007/0248745 A1 | 10/2007 | Wakai et al. |
| 2013/0000458 A1* | 1/2013 | Ueda ...................... B26D 7/018 |
| | | 83/367 |

FOREIGN PATENT DOCUMENTS

| | | |
|---|---|---|
| JP | 2000-208134 A | 7/2000 |
| JP | 2004-303549 A | 10/2004 |
| JP | 2007-258078 A | 10/2007 |
| JP | 2009-266739 A | 11/2009 |
| JP | 2011-100360 A | 5/2011 |
| JP | 2011-206641 A | 10/2011 |
| JP | 2013-043105 A | 3/2013 |

* cited by examiner

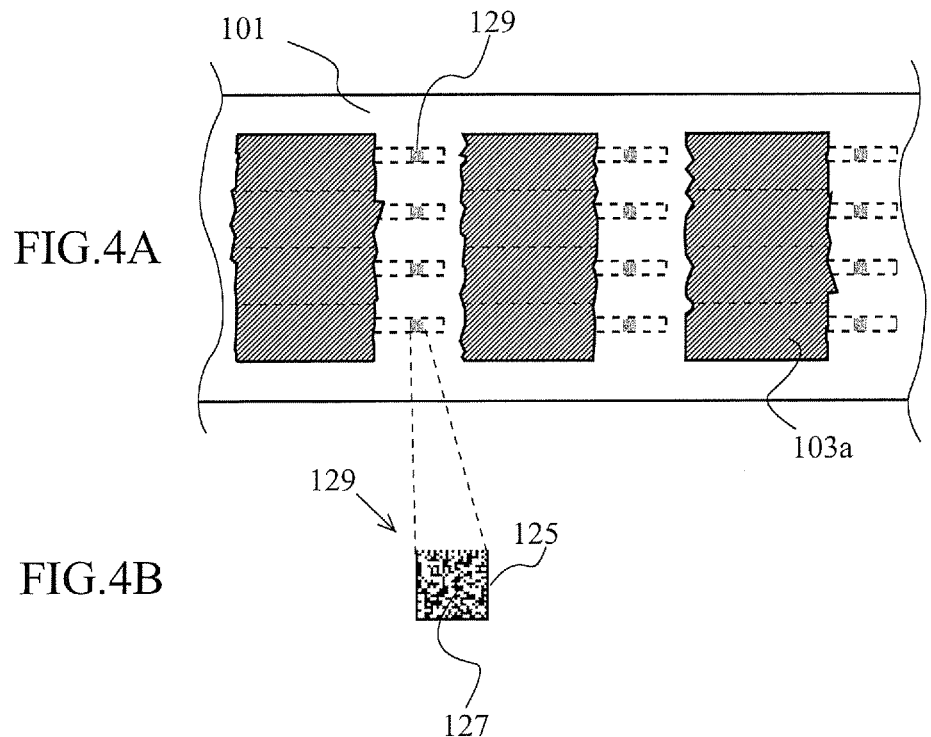
FIG.4A
FIG.4B
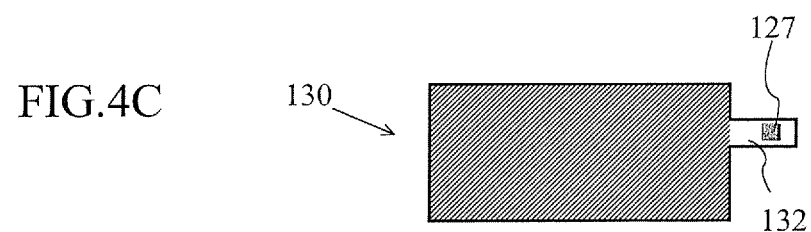
FIG.4C

INTERMITTENTLY COATED BATTERY ELECTRODE MANUFACTURING METHOD

CROSS REFERENCE TO RELATED APPLICATIONS

This application is a National Stage of International Application No. PCT/JP2014/065956 filed Jun. 17, 2014, claiming priority based on Japanese Patent Application No. 2013-163285 filed Aug. 6, 2013, the contents of all of which are incorporated herein by reference in their entirety.

TECHNICAL FIELD

The present invention relates to a battery electrode manufacturing method and, more particularly, to an intermittently coated battery electrode manufacturing method in which an active material layer is intermittently coated.

BACKGROUND ART

A positive electrode for use in a battery, e.g., a lithium-ion secondary battery is manufactured by forming a coating layer obtained by coating a positive electrode active material on a collector made of an aluminum foil at a predetermined film thickness. Similarly, in a negative electrode, a coating layer is formed by coating a negative electrode active material on a collector made of a copper foil.

There are several ways to form such a coating layer. One is to continuously coating an active material on a collector to obtain an electrode web and then to produce, by means of an electrode punching means, an electrode of a predetermined size from the electrode web. Another is to intermittently coat an active material on a collector and then to use an electrode punching means to produce a desired electrode.

The method in which the electrode layer is intermittently coated has an advantage of eliminating a coating layer that is not used in a finally obtained battery; however, there is required a means for making the electrode coating layers on front and back sides coincide with each other.

In order to make positions of the intermittently coated active material layers on the front and back sides coincide with each other, there is proposed a method that detects a front end of a coating part formed on one surface and forms a coating part on the opposite surface by operating a coating means based on a detection signal (see, for example, Patent Document 1).

CITATION LIST

Patent Document

Patent Document 1 JP11-10061A

DISCLOSURE OF THE INVENTION

Problems to be Solved by the Invention

In the invention described in Patent Document 1, it is possible to form a coating layer of the electrode active material at a portion corresponding to a coating layer formed on an opposite surface; however, the following problems exist.

FIGS. 5A to 5C are views for explaining an example of a conventional intermittently coated battery electrode manufacturing method. FIG. 5A is a view for explaining a coating process. FIG. 5B is a cross-sectional view illustrating, in an enlarged manner, a cross section of a part D in FIG. 5A where a coating layer is formed on both surfaces. FIG. 5C is a plan view for explaining the coating layer of an electrode active material intermittently formed on a first surface.

As illustrated in FIG. 5A, a collector 101 delivered from a collector roll 100 is moved at a constant speed in an arrow direction. During the movement, a shutter of a first surface coating die 102a is opened for a time corresponding to a length of an intermittent coating layer to intermittently coat the active material on one surface of the collector, thereby forming a first surface intermittent coating layer 103a.

Then, a second surface coating die controller 105b receives a detection signal indicating that a front end detecting means 104 has detected a front end portion of the first surface intermittent coating layer 103a and opens a shutter of a second surface coating die 102b at a time point when a back surface of the front end portion reaches the second surface coating die 102b, which is determined by a moving speed of the collector, to start coating and closes the shutter after elapse of a predetermined time length, whereby a second surface intermittent coating layer 103b is formed on an opposite surface of the first surface intermittent coating layer 103a.

However, as illustrated in FIG. 5B, which is an enlarged cross-sectional view of the part D in FIG. 5A, a displacement may occur between the first surface intermittent coating layer 103a and second surface intermittent coating layer 103b. Further, an amount of the displacement may differ depending on a position of the electrode.

In a lithium-ion secondary battery, a displacement between positive and negative active material layers opposite to each other through a separator significantly affects battery characteristics. Thus, an electrode having the displacement of the active material layer between the front and back sides cannot be used for a battery, and such a battery has to be discarded.

The causes for such a displacement were investigated, and it was found that the displacement occurred due to formation of an irregular surface at a front end or a rear end of the intermittent coating layer as follows.

As illustrated in FIG. 5C, when an intermittent coating layer 103 is formed on the first surface of the collector 101, it is difficult to avoid an irregular surface 105 displaced from a reference surface from being formed at the front end of the coating layer.

Even when the irregular surface 105 is so small that it does not affect battery charge/discharge characteristics, the front end detecting means 104 that detects the front end of the coating part misidentifies a part of the irregular surface 105 as a front end portion 107. This is the cause of the above-mentioned problem.

Further, an erroneous front end portion detection signal is transmitted to the second surface coating die controller 105b, with the result that the first surface intermittent coating layer 103a and second surface intermittent coating layer 103b do not coincide with each other on both sides of the collector, that is, they are displaced from each other.

Means for Solving the Problems

The problems of the present invention can be solved by an intermittently coated battery electrode manufacturing method, the method including: forming, at a part of a strip-shaped collector where an active material is not coated, a front end indicator indicating a front end of the active material layer to be intermittently coated on the collector; performing coating of the active material on a first surface of the collector based on a detection signal of the front end indicator to form an intermittent coating layer; and starting coating of the intermittent coating layer on a second surface opposite to the first surface based on the detection signal of the same front end indicator as that used for forming the active material coating layer on the first surface.

Advantages of the Invention

According to the intermittently coated battery electrode manufacturing method of the present invention, the front end indicator indicating the front end of the active material layer to be intermittently coated on the strip-shaped collector is formed at a part of the collector where the active material is not coated. Formation of the first surface intermittent coating layer is started based on the front end indicator, and an intermittent coating layer to be formed on the second surface opposite to the first surface is formed based on the same indicator as that used for forming the first surface intermittent coating layer. Thus, there can be provided an intermittently coated battery electrode excellent in quality and having no positional displacement of the active material between the front and back surfaces.

BRIEF DESCRIPTION OF THE DRAWINGS

FIGS. 4A to 4C are views for explaining another embodiment of the intermittently coated battery electrode manufacturing method according to the present invention.

BEST MODE FOR CARRYING OUT THE INVENTION

An intermittently coated battery electrode manufacturing method according to the present invention will be described below with reference to the drawings.

Figure 1A:
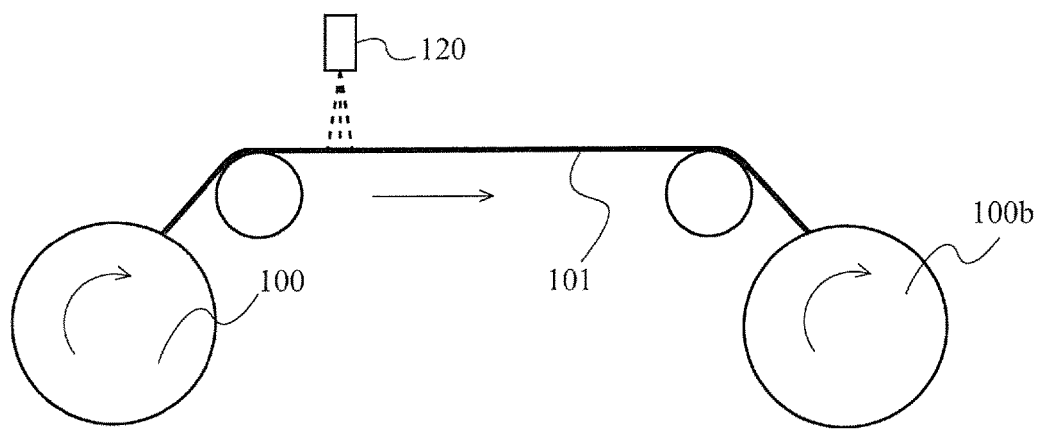
FIGS. 1A and 1B are views for explaining an embodiment of a manufacturing process of a collector in the intermittently coated battery electrode manufacturing method according to the present invention.
Figure 1B:
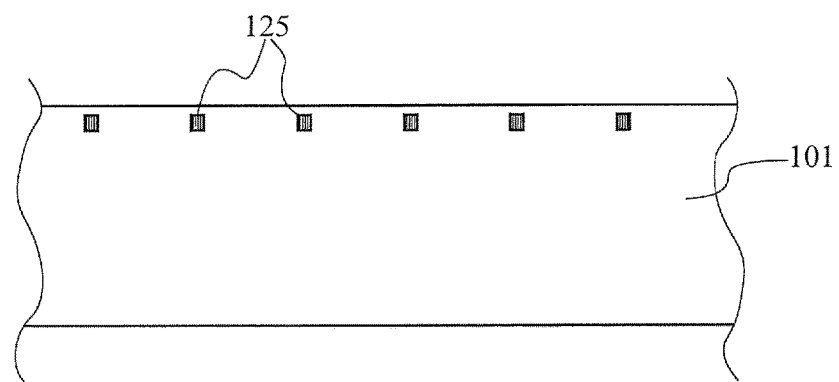

FIGS. 1A and 1B are views for explaining an embodiment of a manufacturing process of a collector in the intermittently coated battery electrode manufacturing method according to the present invention.

A front end indicator forming means 120, such as a laser marking machine or an inkjet print means, that can form a front end indicator on a metal surface is used to forma front end indicator 125 illustrated in a plan view of FIG. 1B a on a part of a collector 101 delivered from a collector roll 100 where coating of an active material is not to be performed.

An interval between adjacent front end indicators 125 can be set inconsideration of a length of an intermittent coating layer in a length direction of the collector, a length of a part that is used as a positive electrode tab or a negative electrode tab, and a length required for handling during manufacturing.

Further, a battery electrode according to the present invention is formed such that active material coating layers to be formed on front and back surfaces of the collector are formed at positions symmetrical to each other with respect to a center surface parallel to a collector surface with each front end indicator 125 as a reference position in the length direction of the collector. Therefore, the front end indicators may be arbitrarily disposed regardless of the interval between the adjacent ones; however, they are preferably disposed at equal pitches in consideration of workability in an assembly work.

The collector 101 on which the front end indicators 125 have been formed is wound by a winding roll 100b and is then coated with the electrode active material on both surfaces of the collector in an intermittent coating process.

Figure 2A:
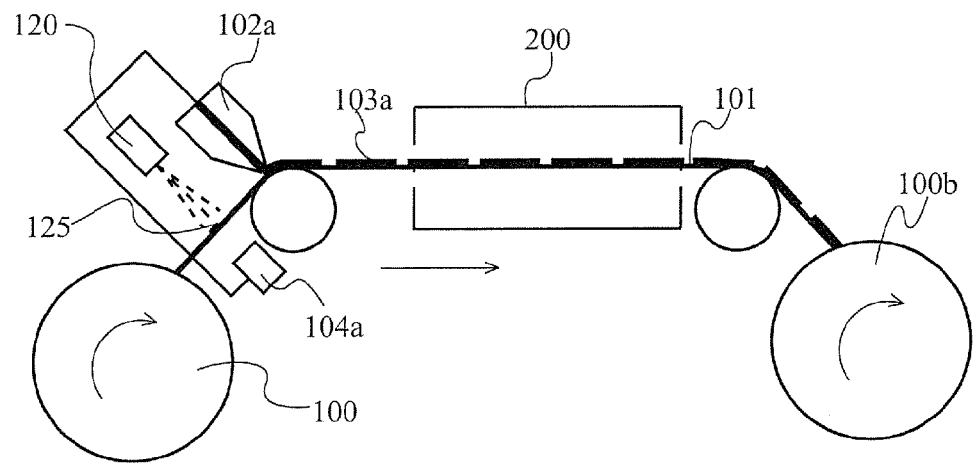
FIGS. 2A to 2C are views for explaining another embodiment of the intermittently coated battery electrode manufacturing method according to the present invention.
Figure 2B:
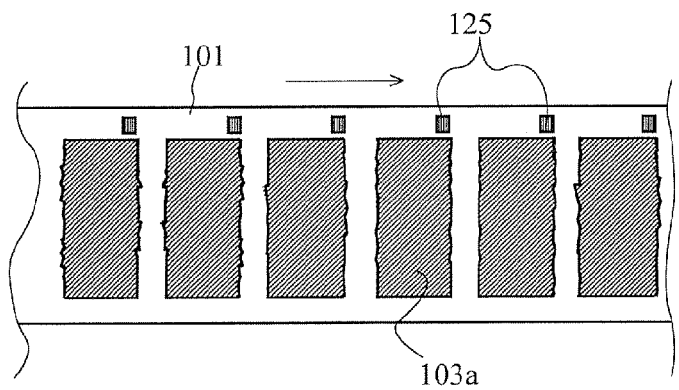
Figure 2C:
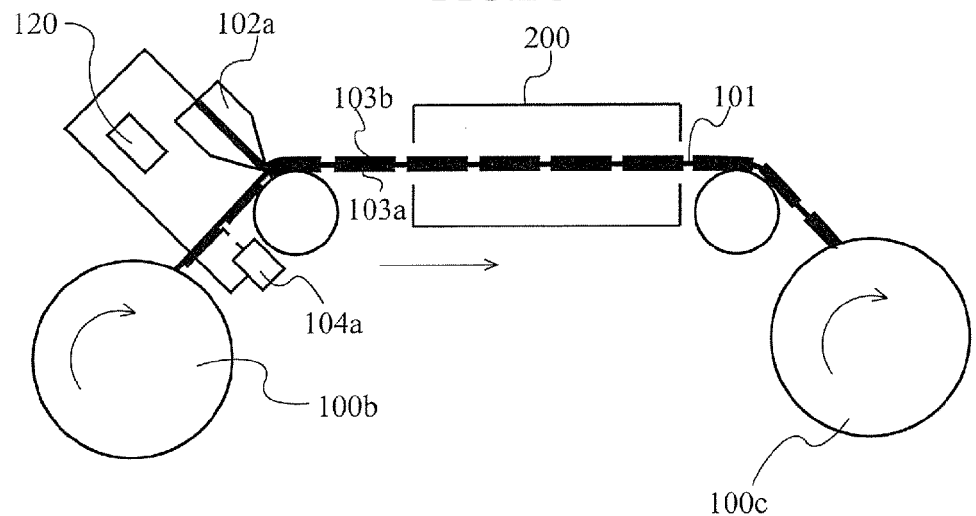

FIGS. 2A to 2C are views for explaining another embodiment of the manufacturing process of the collector in the intermittently coated battery electrode manufacturing method according to the present invention.

As illustrated in FIG. 2A, a front end indicator forming means 120, such as a laser marking machine or an inkjet print means, that can form a front end indicator on a metal surface is used to form a front end indicator 125 illustrated in a plan view of FIG. 2B on a part of the collector 101 delivered from the collector roll 100 where coating of the active material is not to be performed.

An interval between adjacent front end indicators 125 can be set inconsideration of a length of an intermittent coating layer in a length direction of the collector, a length of a part that is used as a positive electrode tab or a negative electrode tab, and a length required for handling during manufacturing.

In the method illustrated in FIGS. 2A to 2C, first, as illustrated in FIG. 2A, the front end indicators 125 illustrated as FIG. 2B are formed on one surface of the collector 101 by the front end indicator forming means 120. At the same time, based on an operation signal of the front end indicator forming means 120, the intermittent coating layers 103a of the active material are each formed by a coating die 102a from a position corresponding to the front end position.

As described above, in the active material coating on one surface side, the front end position detecting means need not be used, but the operation signal of the front end indicator forming means may be used as the operation signal for the coating die when the intermittent coating layer is coated.

Further, when the front end detecting means is used, it is necessary to provide the front end position detecting means on the front end indicator forming means side. However, by using the operation signal of the front end indicator forming means, the following advantage can be obtained.

That is, the front end position detecting means may be provided only on one side surface of the collector foil as illustrated in FIGS. 2A to 2C, allowing reduction in the number of parts to be provided in a coating device.

The collector 101 on which the intermittent coating layers are formed is dried in a dry furnace 200 and then wound by the winding roll 100b, whereby a winding roll having the intermittent coating layers of the active material formed on one surface thereof can be obtained.

Subsequently, as illustrated in FIG. 2C, the winding roll 100b having the active material coating layers formed on one surface thereof is set such that the coating is performed on a surface opposite to that on which the active material coating layers have been formed. Then, the intermittent coating layers 103b of the active material are each formed by the coating die from a position of the front end indicator 125 corresponding to the detection signal from the front end position detecting means 104a positioned at a side opposite to the front end indicator forming means 120 with respect to the collector foil.

The resultant collector is then dried in the dry furnace 200 and then wound by a winding roll 100c, whereby a winding roll having the intermittent coating layers of the active material formed on both surfaces thereof can be obtained.

Further, a battery electrode according to the present invention is formed such that active material coating layers to be formed on front and back surfaces of the collector are formed at positions symmetrical to each other with respect to a center surface parallel to a collector surface with each front end indicator 125 as a reference position in the length direction of the collector. Therefore, the front end indicators may be arbitrarily disposed regardless of the interval between the adjacent ones; however, they are preferably disposed at equal pitches in consideration of workability in an assembly work.

In the above example, simultaneously with formation of the front end indicators 125, the intermittent coating layers 103a of the active material are each formed by the coating die 102a from a position corresponding to the front end position. However, in this configuration, the front end detecting means may be provided on both surfaces of the coating device.

The front end indicator forming means and the front end position detecting means are preferably disposed as close as possible to the coating die so as not to cause a variation in operation thereof due to influence of a minute change in tension to be applied to the collector foil or flexure of the collector foil.

FIGS. 3A to 3D are views for explaining another embodiment of the intermittently coated battery electrode manufacturing method according to the present invention.

Figure 3A:
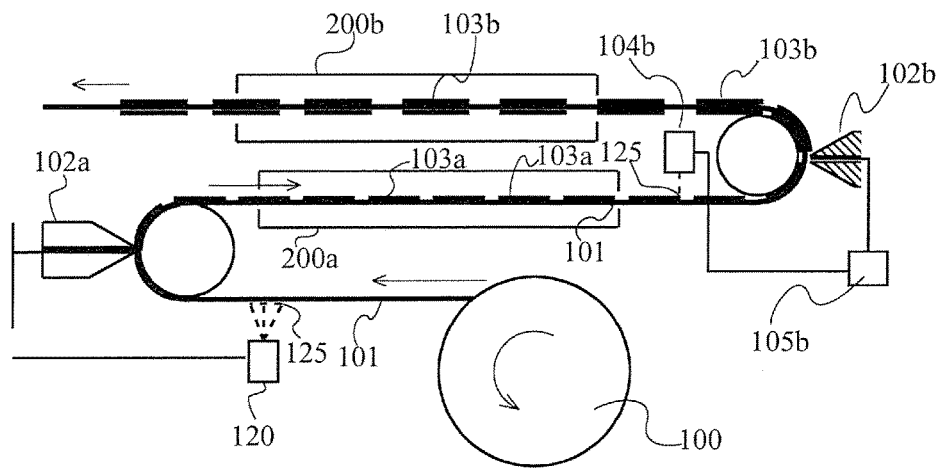
FIGS. 3A to 3D are views for explaining another embodiment of the intermittently coated battery electrode manufacturing method according to the present invention.

As illustrated in FIG. 3A, the collector 101 delivered from the collector roll 100 is moved toward the coating die at a constant speed, and then the front end indicator forming means 120 is used to form the front end indicator 125. Simultaneously with formation of the font end indicator, a shutter of the first surface coating die 102a is opened at a position corresponding to the front end position indicated by the formed front end indicator 125 to start coating of the intermittent electrode layer. Then, at a time point when the coating layer reaches a predetermined coating length, the shutter of the first surface coating die 102a is closed.

At this time, the front end position detecting means is not used, but the operation signal of the front end indicator forming means may be used as the operation signal for the coating die when the intermittent coating layer is coated. Alternatively, the front end position detecting means may be provided (not illustrated) between the front end indicator forming means 120 and the first surface coating die; in this case, the operation signal of the front end indicator forming means may be generated based on the detection signal from the thus provided front end position detecting means. In the configuration illustrated in FIGS. 3A to 3D, the active material layers on the first surface side are formed with the operation signal of the front end indicator forming means used as the operation signal for the coating die when the intermittent coating layer is coated.

Figure 3B:
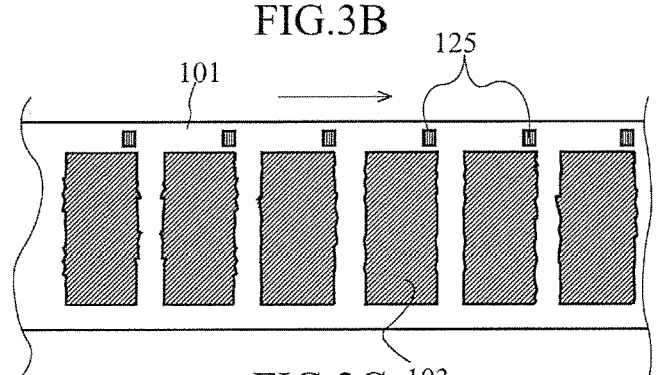

By repeating the above operation, the intermittent electrode layers 103a are each formed on the first surface of the collector 101 on which the front end indicators 125 have been formed with the position indicated by the indicator 125 as the front end. This is illustrated in FIG. 3B.

The collector on which the first surface intermittent coating layers 103a are formed is dried in a dry furnace 200a, whereby the first surface intermittent coating layers are completed.

When each of the front end indicators 125 formed on the first surface reaches a second front end detecting means 104b provided in front of a second surface coating die 102b for coating the active material on a second surface opposite to the first surface, the second front end indicator detecting means 104b detects the front end indicator 125.

As a result, a shutter of the second surface coating die 102b is opened at a time point when the front end position reaches the second surface coating die 102b, which is calculated from a moving speed of the collector 101, to start coating the active material on the second surface.

Figure 3C:
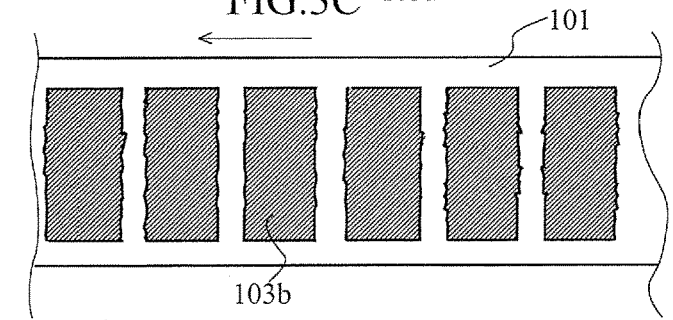

Then, at a time point when the coating layer reaches a predetermined coating length, the shutter of the second surface coating die 102b is closed. As a result, as illustrated in FIG. 3C, the second surface intermittent coating layers 103b are formed.

The resultant collector is then dried in a dry furnace 200b, whereby the coating layers are completed.

As described above, by detecting the front end indicator that has been used in the coating of the active material layer on the first surface of the collector, coating of the active material on the opposing second surface can be started. As a result, it is possible to produce an intermittently coated battery electrode web in which the active material layers symmetrical to the intermittent coating layers on the first surface of the collector have been formed without displacement.

Thus, the intermittent coating layers can be formed without being displaced from the intermittent coating layers on the opposing first surface, whereby positional accuracy of the intermittently coated electrode becomes high.

The first surface coating die and the second surface coating die can operate independently of or in conjunction with each other. Further, not illustrated dancer rolls are provided in front of the first surface coating die 102a and the second surface coating die 102b, respectively. The dancer rolls are provided to prevent the collector foil from being cut due to a sudden change in tension.

Further, the second front end position detecting means 104b is preferably disposed closer to the second surface coating die 102b than to the dancer roll (not illustrated) provided immediately before the second surface coating die. In addition, the second front end position detecting means 104b is preferably disposed as close as possible to the second surface coating die. The reason that the intermittent coating of the active material on the second surface is not performed based on the operation signal of the front end indicator forming means 120 is that a distance between the front end indicator forming means and the second surface coating die is not fixed by the presence of the dancer roll.

Figure 3D:
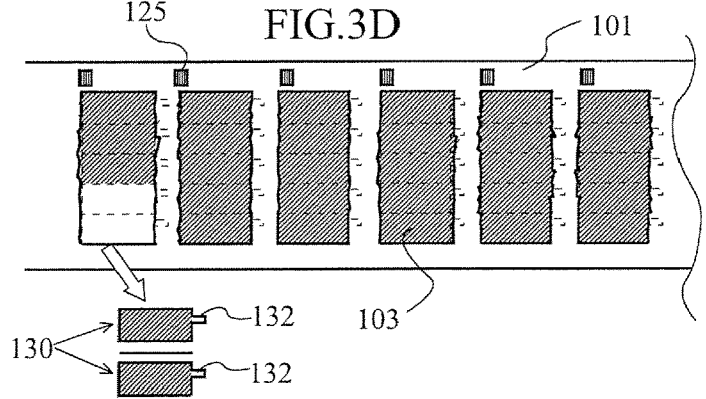
Figure 5A:
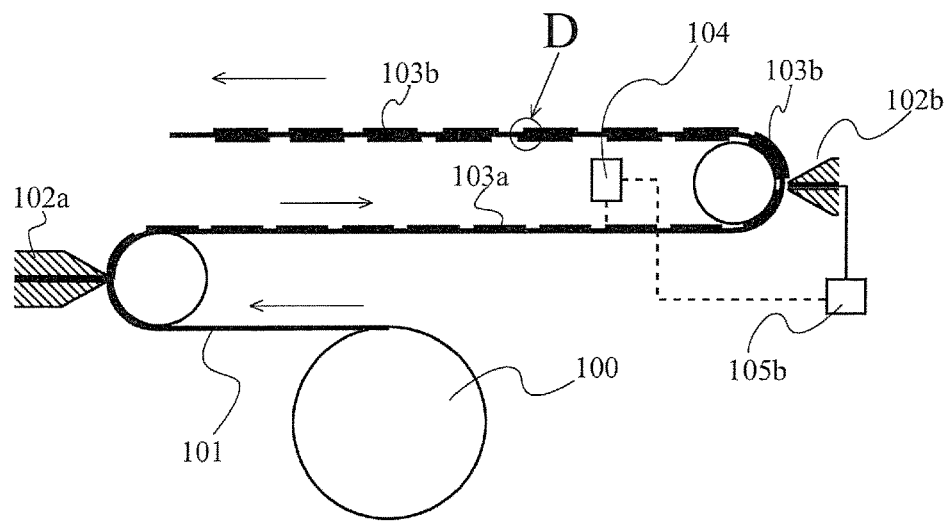
FIGS. 5A to 5C are views for explaining an example of a conventional intermittently coated battery electrode manufacturing method.
Figure 5B:
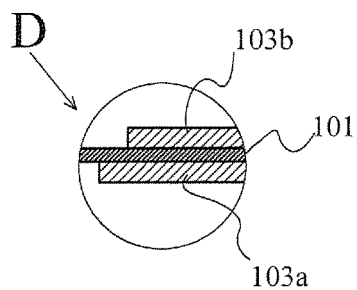
Figure 5C:
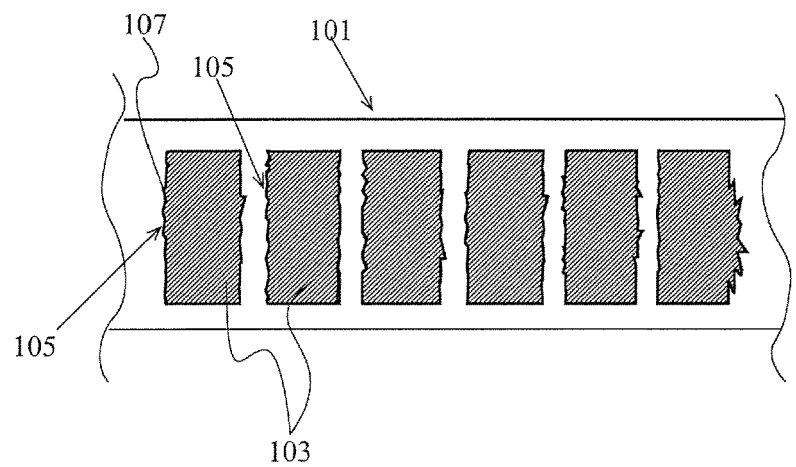

Subsequently, as illustrated in FIG. 3D, an intermittent coating layer 103 coated with the electrode active material and an electrode tab 132 not coated with the active material are integrally cut from the obtained intermittently coated battery electrode web, whereby a unit battery electrode 130 can be obtained.

FIGS. 4A to 4C are views for explaining another embodiment of the intermittently coated battery electrode manufacturing method according to the present invention. FIG. 4A is a view for explaining the intermittent coating layers formed on the collector surface. FIG. 4B is an enlarged view for explaining the front end indicator in the present embodiment.

In the present embodiment, in place of the front end indicator described in FIGS. 1B, 2B, and 3B, a front end indicator 129 with identification information is provided. The front end indicator 129 with identification information integrally includes the front end indicator 125 and the identification information 127.

By the front end indicator 129 with identification information, both the detection of the front end position and identification of each intermittent coating layer 103 can be made.

For example, it is possible to obtain the following function by using the identification information 127.

When an abnormality in, e.g., thickness is found in an inspection after the production of the intermittent coating layer, A, B, C, D, and E indicating width direction positions of the collector and a portion at which the abnormality can be recorded in association with the identification information 127. As a result, after the unit electrodes are cut from the intermittent coating layer, a unit electrode in which the abnormality has been detected in the inspection can be selected for elimination.

FIG. 4C is a view for explaining a produced unit electrode.

In the embodiment illustrated in FIG. 4C, the front end indicators with identification information are formed, for each unit electrode to be cut from the collector, at formation portions of the electrode tabs, respectively, so as to be arranged in a line in a direction perpendicular to the length direction of the collector.

By forming the front end indicators with identification information at the electrode tab formation portions of the respective unit electrodes to be cut from the collector as described above, it is possible to manage each produced unit electrode by the identification information thereof. Thus, traceability in the battery produced using the unit electrode of the present embodiment can be enhanced.

In a configuration where the front end indicator with identification information is positioned inside a battery exterior material after battery assembly, the indicator needs to be formed onto a metal surface by means of a laser marking machine so as not be eluted in electrolyte. On the other hand, in a configuration where the front end indicator with identification information is positioned outside the battery exterior material, the indicator may be formed by an inkjet print means.

The front end indicator 129 with identification information 127 described using FIGS. 4A to 4C may be formed in place of the front end indicator illustrated in FIGS. 2B and 3B. In this case, identification information is not added to the individual unit electrode; however, information of the intermittent coating electrodes may be integrated in one identification information. Further, information concerning a failure such as a pinhole or active material unfilled part occurring in the electrode during a press process or cut process after the electrode coating may be stored in the front end indicator 129 with identification information.

In the present invention, the displacement of the active material refers not only to a state where the coating ends of the adhesive materials on the front and back sides of the collector do not completely coincide with each other, but also to a state where the electrode is displaced from an intended position. For example, when the electrode is produced such that the coating ends of the active materials on the front and back sides of the collector are not intentionally made to coincide, the displacement means a displacement from this state.

INDUSTRIAL APPLICABILITY

According to the intermittently coated battery electrode manufacturing method of the present invention, coating of the intermittent coating layers formed on the first surface of the collector and its opposing second surface is performed based on detection of the front end indicators formed at a portion where the active material is not coated. Thus, the intermittent coating layers can be formed on the second surface without being displaced from those on the first surface and, thus, a battery electrode with no positional displacement of the active material layer can be provided. Further, by adding the identification information to the front end indicator, it is possible to enhance traceability of the battery electrode.

REFERENCE SIGNS LIST

100: Collector roll
100b, 100c: Winding roll
101: Collector
103: Intermittent coating layer
120: Indicator forming means
125: Front end indicator
104a: First front end detecting means
125: Front end indicator
105a: First surface coating die controller
102a: First surface coating die
102b: Second surface coating die
103, 103a, 103b: Intermittent electrode layer
104a: First front end indicator detecting means
104b: Second front end detecting means
125: Front end indicator
127: Identification information
129: Front end indicator with identification information

The invention claimed is:

1. An intermittently coated battery electrode manufacturing method comprising:

forming, on a part of a first surface of a strip-shaped collector where an active material is not coated, a front end indicator indicating a front end of the active material to be intermittently coated on the collector, based on an operation signal;

coating intermittent layers of the active material on the first surface of the strip-shaped collector with a coating die which is responsive to the operation signal used to form the front end indicator; and coating intermittent layers of the active material on a second surface of the strip-shaped collector, the second surface opposite to the first surface, based on a detection signal of the front end indicator.

2. The intermittently coated battery electrode manufacturing method according to claim 1, wherein
the front end indicator is positioned inside of a battery outer case, and is not eluted to an electrolyte.

3. The intermittently coated battery electrode manufacturing method according to claim 1, wherein
the front end indicator comprises identification information.

4. The intermittently coated battery electrode manufacturing method according to claim 3, wherein
the identification information is linked to coating layer inspection result information so as to sort a defective product.

5. The intermittently coated battery electrode manufacturing method according to claim 1, wherein the coating of the intermittent layers of the active material on the first surface of the strip-shaped collector and the coating of the intermittent layers on the second surface opposite to the first surface are performed such that a position of the intermittent layers of the active material on the first surface and a position of the intermittent layers of the active material on the second surface coincide.

6. A battery management method wherein
a battery that uses a battery electrode manufactured by a method as claimed in claim 1 is linked to battery use information so as to manage the battery.

* * * * *